US012666236B2

(12) United States Patent
Alpert et al.

(10) Patent No.: US 12,666,236 B2
(45) Date of Patent: Jun. 23, 2026

(54) BLE LINK-CLUSTER ARCHITECTURE

(71) Applicant: Texas Instruments Incorporated, Dallas, TX (US)

(72) Inventors: Yaron Alpert, Hod Hasharon (IL); Yuval Matar, Kiryat Mozkin (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 184 days.

(21) Appl. No.: 18/317,982

(22) Filed: May 16, 2023

(65) Prior Publication Data

US 2023/0292096 A1 Sep. 14, 2023

Related U.S. Application Data

(63) Continuation of application No. 17/669,225, filed on Feb. 10, 2022, now Pat. No. 11,696,104.

(51) Int. Cl.
*H04W 76/25* (2018.01)
*H04W 4/80* (2018.01)

(52) U.S. Cl.
CPC ............. *H04W 4/80* (2018.02); *H04W 76/25* (2018.02)

(58) Field of Classification Search
CPC ....... H04W 4/80; H04W 76/25; H04W 76/15; H04W 80/12; H04W 8/22; H04B 7/2612
See application file for complete search history.

(56) References Cited

U.S. PATENT DOCUMENTS

| | | | |
|---|---|---|---|
| 9,900,880 B1 * | 2/2018 | Zakaria | ................. H04L 67/104 |
| 10,278,122 B2 * | 4/2019 | Periyalwar | ............ H04L 47/196 |
| 10,608,692 B1 * | 3/2020 | Ramakrishnan | ........ H04W 4/80 |

| | | | |
|---|---|---|---|
| 11,690,115 B1 * | 6/2023 | Marupaduga | ......... H04W 76/15 |
| | | | 370/329 |
| 2013/0163496 A1 | 6/2013 | Trainin et al. | |
| 2015/0365999 A1 | 12/2015 | Lee et al. | |
| 2017/0318529 A1 | 11/2017 | Wiser | |
| 2018/0220258 A1 * | 8/2018 | Kerai | ...................... H04W 4/80 |
| 2019/0150214 A1 * | 5/2019 | Zhou | ..................... H04W 76/15 |
| | | | 370/329 |
| 2020/0092893 A1 | 3/2020 | Allan et al. | |
| 2020/0195502 A1 | 6/2020 | Miyoshi | |
| 2020/0394150 A1 * | 12/2020 | Lanka | .................. G06F 13/4226 |
| 2021/0168066 A1 | 6/2021 | Arvidson et al. | |

(Continued)

OTHER PUBLICATIONS

Woolley, Martin, "Bluetooth® Core Specification Version 5.3 Feature Enhancements," Version: 1.0.0; Revision Date: Jun. 24, 2021, 40 pgs.

*Primary Examiner* — Andrew Wendell

(74) *Attorney, Agent, or Firm* — Michelle F. Murray; Frank D. Cimino

(57) ABSTRACT

A device includes a BLUETOOTH low energy (BLE) link layer (LL) controller configured to maintain a link cluster including multiple links between the device and one or more connected devices that share parameters associated with the link cluster and to process data associated with the links of the link cluster at a LL. The links of the link cluster established according to a BLE communication standard. The device further includes or is coupled to BLE physical link (PHY) interfaces coupled to the BLE LL controller and configured to exchange the data on different links of the link cluster at different respective signal frequencies, interface with the BLE LL controller, and process the data at a PHY layer.

24 Claims, 9 Drawing Sheets

(56)          References Cited

U.S. PATENT DOCUMENTS

| 2021/0235486 | A1* | 7/2021 | Atefi | H04W 74/002 |
| 2022/0061119 | A1 | 2/2022 | Machani et al. | |
| 2022/0248485 | A1* | 8/2022 | Novoa | H04L 5/001 |
| 2022/0418022 | A1* | 12/2022 | Kneckt | H04W 36/06 |

* cited by examiner

BLE LINK-CLUSTER ARCHITECTURE

CROSS-REFERENCE TO RELATED APPLICATIONS

This application is a continuation of U.S. patent application Ser. No. 17/669,225, filed Feb. 10, 2022, which application is hereby incorporated herein by reference.

BACKGROUND

BLUETOOTH low energy (BLE) is a wireless communication technology useful for various applications and devices, such as in healthcare, fitness, security, home entertainment, and communication devices. The BLE communication technology provides for lower power consumption of communication devices in comparison to BLUETOOTH or other wireless communication technologies, while also maintaining a similar wireless communication range and coverage. The reduced power consumption of the communication devices may be achieved by reducing device connection time in comparison to BLUETOOTH or the other wireless communication technologies. The BLE communication technology is based on a BLE communication standard supported by various operating systems (OS), including ANDROID, IOS, WINDOWS, MACOS, LINUX, and other OS to operate the communication devices.

SUMMARY

In accordance with at least one example of the disclosure, a device includes a BLE link layer (LL) controller configured to maintain a link cluster including multiple links between the device and one or more connected devices that share parameters associated with the link cluster and to process data associated with the links of the link cluster at a LL, where the links of the link cluster established according to a BLE communication standard, and BLE physical link (PHY) interfaces coupled to the BLE LL controller and configured to exchange the data on different links of the link cluster at different respective signal frequencies, interface with the BLE LL controller, and process the data at a PHY layer In accordance with at least one example of the disclosure, an apparatus includes a non-transitory memory configured to store instructions and a processor coupled to the non-transitory memory, where executing the instructions causes the processor to be configured to maintain a link cluster including multiple links between the apparatus and one or more connected devices that share parameters associated with the link cluster and to process data associated with the links of the link cluster at a LL, where the links of the link cluster are established according to a BLE communication standard, process the data at a PHY layer, and exchange data on different links of the link cluster at different respective signal frequencies and at respective BLE PHY interfaces coupled to the LL.

In accordance with at least one example of the disclosure, a system includes a BLE device including a BLE LL controller configured to maintain a link cluster including multiple links between the BLE device and one or more connected devices that share parameters associated with the link cluster and to process data associated with the links of the link cluster at the LL, where the links of the link cluster established according to a BLE communication standard, and transmitter devices including respective BLE PHY interfaces coupled to the BLE LL controller via one or more networks and configured to exchange the data on different links of the link cluster at different respective signal frequencies with the one or more connected devices, interface with the BLE LL controller and process the data at a PHY layer.

DETAILED DESCRIPTION

Figure 1:
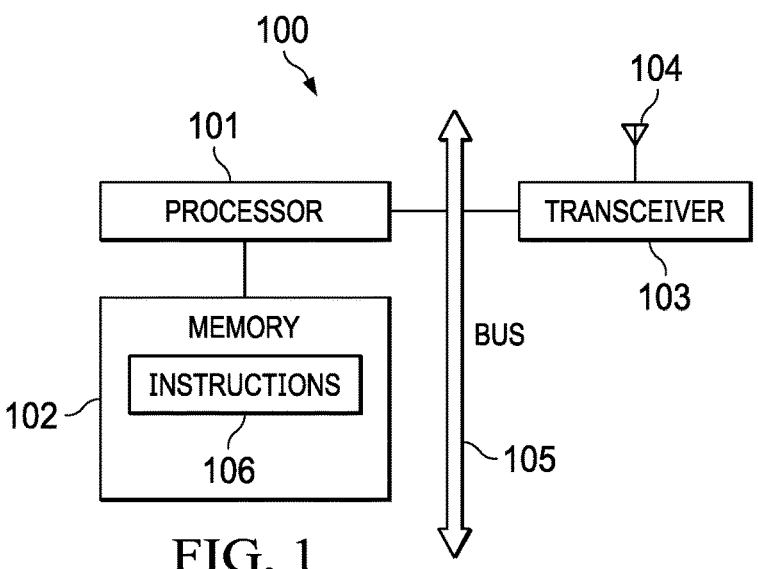
FIG. 1 is a block diagram of a processing and communication system, in accordance with various examples.

According to the BLE communication standard in the Bluetooth Core Specification Verification 5.3 which is incorporated herein by reference, data transfers may be carried over links, which are connections established between communication devices to exchange data in the form of messages or frames. The communication devices, which are also referred to as BLE devices, include a central device and one or more peripheral devices. The peripheral devices may have limited power available in comparison to the central device. For example, the central device may be a smartphone, a tablet, or a laptop. The peripheral device may be a sensor device or a wearable device, such as a temperature sensor or a wireless earphone, that has a smaller battery or a battery with a more limited power storage than the central device. The central device may also have a power supply other than a battery, such as a gateway or a computer device plugged to a power outlet. The links between the BLE devices are wireless links that can be established via radio frequency (RF) connections.

A group of BLE devices can communicate in a multi-peripherals mode where multiple peripheral devices are connected to a single central device via respective links. In the multi-peripherals mode, there is a single BLE link between each peripheral device and the central device. A group of BLE devices may also communicate in a multi-centrals mode where multiple central devices are connected to a single peripheral device via respective links. In the multi-centrals mode, there is a single BLE link between each central device and the peripheral device. In either mode, the same peripheral device may be limited according to the BLE device architecture to a single BLE link with the same central device.

The description provides for examples to expand the BLE device architecture to support multiple links simultaneously, also referred to herein as a link cluster, between a BLE device and one or more other BLE devices. The BLE devices connected by a link cluster may share same parameters related to the link cluster. The link cluster can be established between the same or different central devices on one end of the link cluster and the same or different peripheral devices on the other end of the link cluster. The established link cluster can be useful to transmit data in the direction from the BLE device, also referred to herein as uplink, or in the direction to the BLE device, also referred to herein as downlink. The data can be transmitted on different links, within the link cluster, in the same direction (e.g., uplink or downlink) or in different directions (e.g., uplink and downlink). The messages of frames transmitted on the links may be separated by transmission gaps in time. For example, a message or frame may be transmitted on a first link during a transmission gap on a second link, or in parallel to other transmissions on one or more links. The expanded BLE device architecture is referred to herein as a BLE link-cluster architecture. The BLE link-cluster architecture can support a group of BLE devices that communicate in both the multi-peripherals mode and the multi-centrals mode. For example, a BLE device may be a first central device connected to one or more peripheral devices and, simultaneously, may also be a peripheral device connected to one or more other central devices. The BLE devices connected by a link cluster to one or more other BLE devices is also referred to herein as link-cluster BLE device (LCB).

The BLE link-cluster architecture configures the LCB, which may be a central device or a peripheral device, with multiple BLE PHY layers and a single BLE logical link control (LLC) layer, also referred to herein as a BLE LL, for data processing and handling. The multiple links of the link cluster connect the same LCB with another LCB to transmit and receive data in the form of messages, frames, or fragments of frames on the uplink or downlink. The BLE link-cluster architecture is aware of and accordingly coordinates the transmission on the multiple links within the link cluster. The BLE link-cluster architecture synchronizes the transmission and reception of the LCB and enables the transmission or reception over the multiple links within the link cluster, simultaneously. The BLE link-cluster architecture also enables frames fragmenting and reassembly on multiple links within the link cluster, frames or fragments duplication, duplicated frames or fragments detection, dynamic switching of frames or fragments on the links within the link cluster, simultaneous transmission and reception of frames or fragments on different links within the link cluster, and frames or fragments retransmission on different links within the link cluster. The transmission and reception can be coordinated on the multiple links within the link cluster to reduce cross-link interference among the links of the same LCB and between different LCB connected by the link cluster, such as by transmitting the signals that carry the data on the links at different respective frequencies. The messages or frames can be distributed over the multiple links within the link cluster to increase communication throughput. Distributing the transmission over multiple links also reduces latency, response time, and power consumption of the LCB. In other examples, the messages or frames can be replicated and transmitted over the multiple links to provide redundancy and accordingly increase the robustness of communications.

FIG. 1 is a block diagram of a processing and communication system 100 useful for processing and exchanging data, in accordance with various examples. The processing and communication system 100 may be a BLE device or LCB which is capable of establishing a connection to transmit and receive messages or frames in accordance with a BLE communication standard. For example, the processing and communication system 100 may be a central device, such as a router, a computer device or a smartphone, or may be a peripheral device such as an Internet of Things (IoT) device, a sensor or other BLE device capable of establishing a connection with a second BLE device or a network, such as the Internet. In some examples, the processing and communication system 100 may be a system on a chip (SoC), an electronic circuit board or a computer card of a BLE device. The processing and communication system 100 includes hardware components for establishing a connection and transmitting and receiving data in accordance with the BLE communication standard. As shown in FIG. 1, the processing and communication system 100 may include one or more processors 101 and one or more memories 102. The processing and communication system 100 may also include one or more transceivers 103 and one or more antennas 104 for establishing wireless connections. These components may be coupled through a bus 105, or in any other suitable manner. In FIG. 1, an example in which the components are coupled through a bus 105 is shown.

The processor 101 is configured to read and execute computer-readable instructions. For example, the processor 101 is configured to invoke and execute instructions in a program stored in the memory 102, including instructions 106. Responsive to the processor 101 transmitting data, the processor 101 drives or controls the transceiver 103 to perform the transmitting. The processor 101 also drives or controls the transceiver 103 to perform receiving, responsive to the processor 101 receiving data. Therefore, the processor 101 may be considered as a control center for performing transmitting or receiving data and the transceiver 103 is an executor for performing the transmitting and receiving operations.

In some examples, the memory 102 is coupled to the processor 101 through the bus 105. In other examples, the memory 102 is integrated with the processor 101. The memory 102 is configured to store various software programs and/or multiple groups of instructions, including the instructions 106. The memory 102 may include one or more storage devices. For example, the memory 102 includes a high-speed random-access memory and/or may include a nonvolatile memory such as one or more disk storage devices, a flash memory or another nonvolatile solid-state storage device. The memory 102 may store an OS such as ANDROID, IOS, WINDOWS or LINUX. The memory 102 may further store a network communications program. The network communications program is useful for performing communications with one or more attached devices, one or more user equipments, or one or more network devices. The memory 102 may further store a user interface program. The user interface program displays content of an application through a graphical interface and receive data or an operation performed by a user on the application via an input control such as a menu, a dialog box or a physical input device (not shown). The memory 102 is configured to store the instructions 106 for implementing the various methods and processes provided in accordance with the various examples of this description.

The transceiver 103 includes a transmitter and a receiver. The transceiver 103 is configured to transmit a signal that is provided by the processor 101. The transceiver 103 is also configured to receive a signal from other devices or equipments. In this example, the transceiver 103 may be considered a wireless transceiver. The antenna 104 may be configured to enable the exchanging of wireless communication signals between the transceiver 103 and a network or another system or device.

The processing and communication system 100 may also include another communication component such as a Global Positioning System (GPS) module, cellular module, a BLUETOOTH or BLE module, Zigbee module, Long Term Evolution (LTE), LTE-Machine Type Communication (LTE-M), Narrow Band LTE (NB-LTE), Sub-Gigahertz Communication (sub1G), or a Wireless Fidelity (WI-FI) module. The processing and communication system 100 may also support another wireless communication signal such as a satellite signal or a short-wave signal. The processing and communication system 100 may also be provided with a wired network interface or a local area network (LAN) interface to support wired communication.

In various examples, the processing and communication system 100 may further include an input/output interface (not shown) for enabling communications between the processing and communication system 100 and one or more input/output devices (not shown). Examples of the input/output devices include an audio input/output device, a key input device, a display and the like. The input/output devices are configured to implement interaction between the processing and communication system 100 and a user or an external environment. The input/output device may further include a camera, a touchscreen, a sensor, and the like. The input/output device communicates with the processor 101 through a user interface.

The processing and communication system 100 shown in FIG. 1 is an example of implementation in various examples of this description. During actual application, the processing and communication system 100 may include more or fewer components. The processing and communication system 100 may be part of a BLE device or LCB that is connected to other BLE devices or LCBs.

Figure 2:
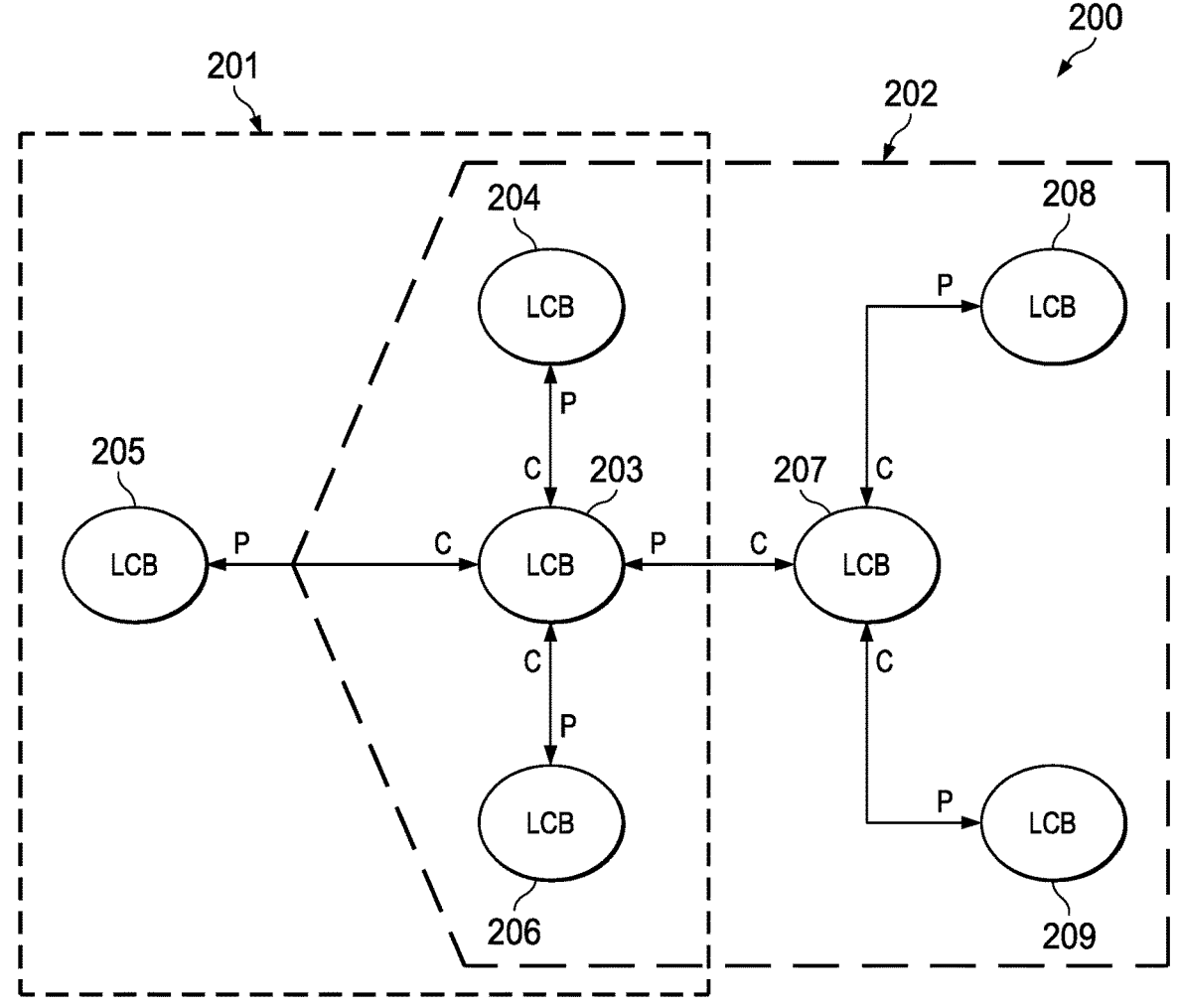
FIG. 2 is a diagram of a group of connected BLE devices, in accordance with various examples.

FIG. 2 is a diagram of a group 200 of connected LCBs, in accordance with various examples. The group 200 of LCBs includes a first network 201 and a second network 202 of LCBs that communicate with each other. The first network 201 includes a first central device 203 connected in a multi-peripherals mode via respective links (designated in FIG. 2 as central device (C) to peripheral device (P) links) to a first peripheral device 204, a second peripheral device 205, and a third peripheral device 206. The second network 202 includes a second central device 207 also connected in a multi-peripherals mode via respective links to a fourth peripheral device 208 and a fifth peripheral device 209. The first central device 203 is also connected as a peripheral device to the second central device 207.

Figure 3:
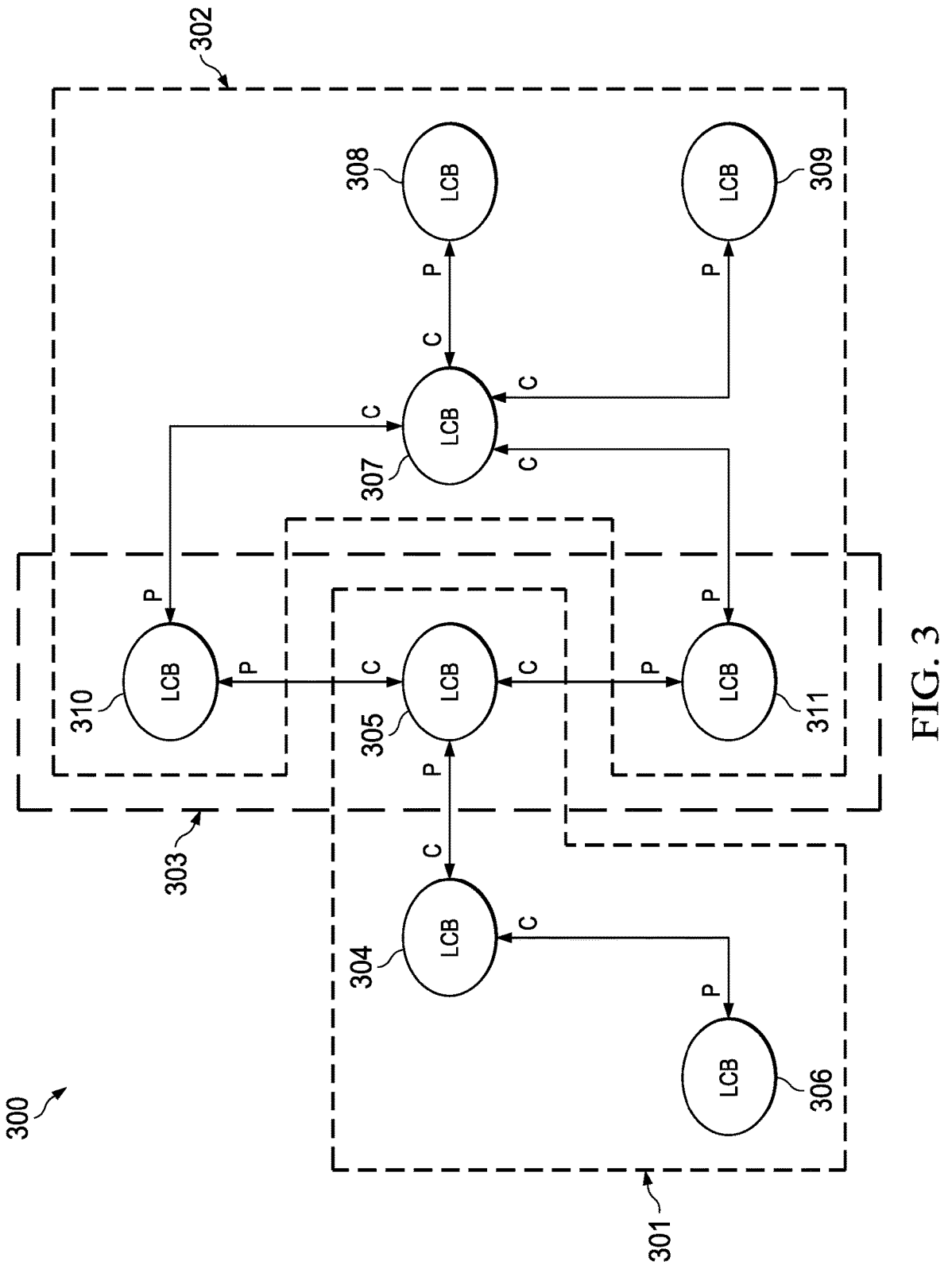
FIG. 3 is a diagram of a group of connected BLE devices, in accordance with various examples.

FIG. 3 is a diagram of a group 300 of connected LCB s which may include SoCs, electronic circuit boards or computer cards, in accordance with various examples. The group 300 of LCBs includes a first network 301, a second network 302 and a third network 303 of LCBs that communicate with each other. The first network 301 includes a first central device 304 connected in a multi-peripherals mode via respective links (designated in FIG. 3 as C P links) to a first peripheral device 305 and a second peripheral device 306. The second network 302 includes a second central device 307 connected in a multi-peripherals mode via respective links to a third peripheral device 308, a fourth peripheral device 309, a fifth peripheral device 310 and a sixth peripheral device 311. The third network 303 includes the first peripheral device 305, the fifth peripheral device 310, and the sixth peripheral device 311.

As shown in FIG. 3, the first peripheral device 305 is also connected as a central device in a multi-peripherals mode to the fifth peripheral device 310 and the sixth peripheral device 311. The fifth peripheral device 310, and similarly the sixth peripheral device 311, are each connected in a multi-centrals mode to both the second central device 307 and the first peripheral device 305, which is also acting as a central device in third network 303.

In the group 300 or 200 of LCB s, a pair of connected LCB s is enabled, according to a BLE link-cluster architecture, to establish multiple links within a link cluster between each other simultaneously. The BLE link-cluster architecture also enables a LCB to establish multiple links in a link cluster with multiple other BLE devices simultaneously. The BLE link-cluster architecture coordinates and synchronizes the transmission over the multiple links of the link cluster to enable simultaneous transmission and/or reception of signals between the LCBs in a multi-peripherals mode, multi-centrals mode, or both.

Figures 4, 5, 6:
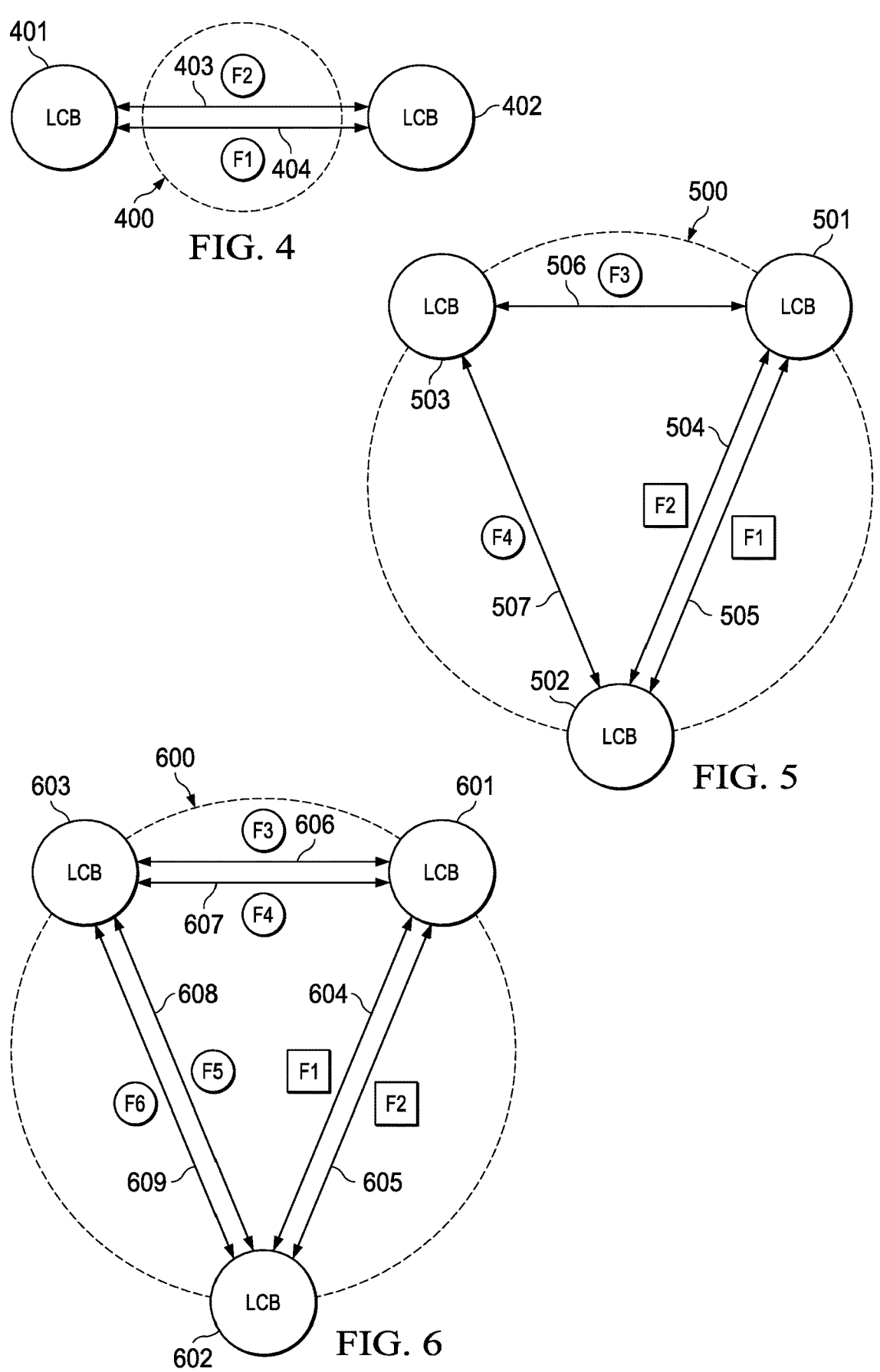
FIG. 4 is a diagram of a link cluster between BLE devices, in accordance with various examples.
FIG. 5 is a diagram of a link cluster between BLE devices, in accordance with various examples.
FIG. 6 is a diagram of a link cluster between BLE devices, in accordance with various examples.

FIG. 4 is a diagram of a link cluster 400 between LCBs, in accordance with various examples. The LCBs include a first LCB 401 and a second LCB 402 that are connected, simultaneously, between each other via multiple links in the link cluster 400. For example, as shown in FIG. 4, the first LCB 401 is a central device and the second LCB 402 is a peripheral device connected to each other by a first link 403 and a second link 404 simultaneously. Accordingly, the first LCB 401 and the second LCB 402 can transmit or receive messages or frames on each of the first link 403 and the second link 404 simultaneously. The messages or frames may be transmitted on the first link 403 in the form of a first signal at a first frequency (F1) and on the second link 404 in the form of a second signal at a second frequency (F2). Transmitting the first signal and the second signal at different frequencies may reduce cross-link interference in the first signal and the second signal at the first LCB 401 and the second LCB 402.

In some examples, the messages or frames are distributed over the first link 403 and the second link 404 to increase communication throughput, reduce latency or response time, and/or reduce power consumption of the first LCB 401 and the second LCB 402. The messages or frames are distributed on the links by transmitting a first portion of the messages or frames on the first link 403 and a second portion of the messages or frames on the second link 404. In other examples, the messages or frames are replicated and transmitted as a first copy of messages or frames on the first link 403 and as a second copy of the same messages or frames on the second link 404 to provide redundancy and increase the robustness of communications.

FIG. 5 is a diagram of a link cluster 500 between LCBs, in accordance with various examples. The LCBs include a first LCB 501, a second LCB 502, and a third LCB 503 that are connected, simultaneously, via one or multiple links in the link cluster 500 between each other. For the example, the first LCB 501 is a central device and the second LCB 502 is a first peripheral device connected to each other, simultaneously, by a first link 504 and a second link 505. The first LCB 501 and the second LCB 502 can transmit or receive messages or frames on each of the first link 504 and the second link 505 simultaneously. The third LCB 503 is a second peripheral device connected to the first LCB 501 by a third link 506 and connected to the second LCB 502 by a fourth link 507. To reduce cross-link interference among the links at the BLE devices, messages or frames may be transmitted at a first frequency (F1) on the first link 504 and at a second frequency (F2) on the second link 505, at a third frequency (F3) on the third link 506, and at a fourth frequency (F4) on the fourth link 507.

In other examples, multiple links can be established in a link cluster between two or more LCBs, including between two peripheral devices. FIG. 6 shows a link cluster 600 between LCBs, in accordance with various examples. The LCBs include a first LCB 601, a second LCB 602, and a third LCB 603 that are connected between each other via multiple links in the link cluster 600. For the example, the first LCB 601 is a central device and the second LCB 602 is a first peripheral device connected to each other by a first link 604 and a second link 605 simultaneously. The third LCB 603 is a second peripheral device connected to the first LCB 601 by a third link 606 and a fourth link 607 simultaneously, and connected to the second LCB 602 by a fifth link 608 and a sixth link 609 simultaneously. Accordingly, the first LCB 601, the second LCB 602, and the third LCB 603 can transmit or receive messages or frames on each of the first, second, third, fourth, fifth and sixth links 604, 605, 606, 607, 608 and 609 simultaneously. To reduce cross-link interference among the links at the different LCBs and among the links at the same LCB, messages or frames may be transmitted on the first, second, third, fourth, fifth and sixth links 604, 405, 606, 607, 608 and 609 at the different frequencies F1, F2, F3, F4, F5 and F6, respectively.

In the examples of the link clusters 400, 500, and 600, the LCBs are enabled to establish multiple links between each other within a link cluster based on a BLE link-cluster architecture. The BLE link-cluster architecture configures the LCB, which may be a central device or a peripheral device, with multiple BLE PHY interfaces and a single BLE LL. The multiple BLE PHY interfaces allow a first LCB to establish multiple respective links with a second LCB or with multiple LCBs. The multiple BLE PHY interfaces are coupled to the same BLE LL at the LCB, which is aware of the messages or frames transmitted or received on each of the multiple links. Accordingly, the transmission of the messages or frames can be synchronized and coordinated on the multiple links at the LCB.

Figure 7:
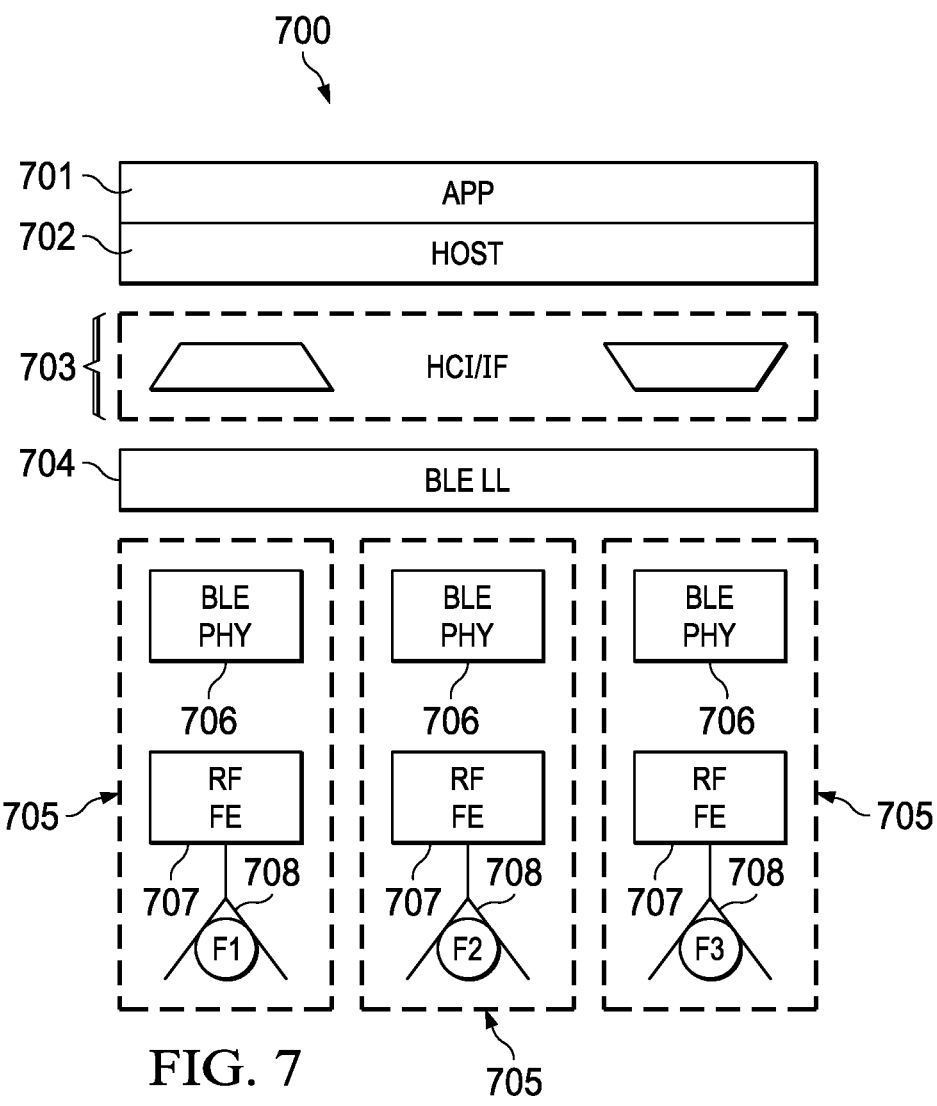
FIG. 7 is a diagram of a BLE link-cluster architecture for establishing a link cluster with multiple links for a BLE device, in accordance with various examples.

FIG. 7 is a diagram of a centralized BLE link-cluster architecture 700 for establishing a link cluster with multiple links for a single BLE device, in accordance with various examples. The device BLE link-cluster architecture 700 provides a LCB with a capability of establishing with one or more other LCBs multiple links simultaneously via the device duplicate BLE PHY interfaces. The multiple links increase the robustness of communications and communication throughput, as described above. The LCB s connected via the link cluster may include any combination of central devices and peripheral devices. The BLE link-cluster architecture 700 also enables an LCB that acts as both a central device and a peripheral device with other LCBs to establish respective links simultaneously with the other LCBs.

The centralized BLE link-cluster architecture 700 includes data handling blocks that are configured to process data and signals at different communication layers of a BLE protocol, according to the BLE communication standard. The data is processed and managed at the different communication layers in the arrangement order of the data handling blocks in the BLE link-cluster architecture 700. The data handling blocks can be implemented via software, hardware such as a circuit, or both. The data handling blocks are coupled to each other in the order shown in FIG. 7 and include an application layer manager (APP) 701, a host layer manager (Host) 702, a host to controller interface (HCI/IF) 703, a BLE LL controller 704, and duplicate transceivers 705. The duplicate transceivers 705 include respective BLE PHY interfaces to the BLE LL controller 704. Each transceiver 705 includes a BLE PHY controller 706, a radio frequency front end (RF FE) 707, and a RF antenna 708. Each transceiver 705 is configured to establish a respective link at the LCB, transmit or receive data on the respective link, and manage the data at the signaling and RF levels.

The APP 701 interacts with BLE applications and profiles and manages data accordingly. The APP 701 processes the data of an application at the application level according to the application profile. For example, the BLE applications and profile are IoT applications and profiles. The Host 702 interfaces with the APP 701 and manages host device functions such as BLE device discovery, connection related services, security initiation, device pairing, security key exchange, data encapsulation, data attributes, or other application interface features. The HCI/IF 703 provides communication between the Host 702 and the BLE LL controller 704 via a suitable communication interface type, such as an application programming interface (API), a universal asynchronous receiver-transmitter (UART), a serial peripheral interface (SPI), or a universal serial bus (USB). The BLE LL controller 704 maintains simultaneously multiple links between the LCB of the BLE link-cluster architecture 700 and one or more connected LCBs to process data associated with the links at the LL. The BLE LL controller 704 may handle advertising, scanning, and creating or maintaining connections of the respective links at the LCB. For example, the connections may be handled according to the transmission mode of the LCB (e.g., unicast or broadcast) or according to the role of the LCB (e.g., central or peripheral device, advertiser or scanner, broadcaster or observer). Examples of the LL states include scanning, advertising, initiating, connection, synchronization and standby states.

The transceivers 705 provide BLE PHY interfaces to the BLE LL controller 704. In each transceiver 705 that establishes a respective link of the links at the LCB, the BLE PHY controller 706 manages data exchange in a form of messages or frames on the links simultaneously and interfaces with the BLE LL controller 704. The BLE PHY controller 706 processes the data at the PHY layer including modulating the data for transmission according to a modulation scheme at a certain data rate and a certain frequency. The RF FE 707 manages transmission and reflection of the data via the RF antenna 708. The data signals may be transmitted or received at different frequencies on the different links. For example, as shown in FIG. 7, the BLE link-cluster architecture 700 may provide three transceivers 705 that transmit or receive signals at F1, F2 and F3 on three respective links simultaneously. The three links may connect a first LCB to a second LCB or to multiple other LCBs. For example, a first LCB configured with the BLE link-cluster architecture 700 may be a central device that connects to a first peripheral device with three links simultaneously, or connects to the first peripheral device with two links and simultaneously to a second peripheral device with a third link.

Figure 8:
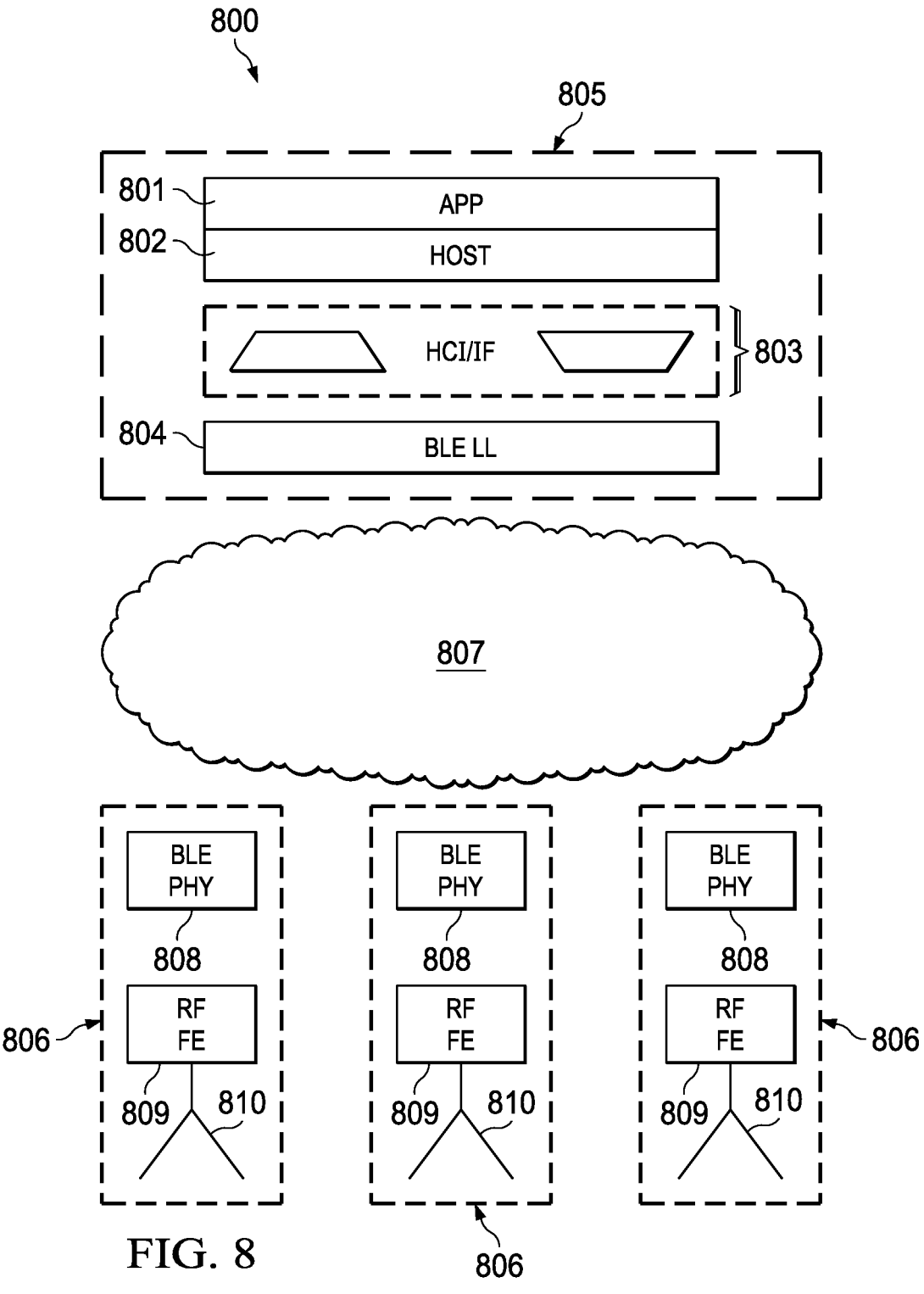
FIG. 8 is a diagram of a BLE link-cluster architecture for establishing a link cluster with multiple links for a BLE device, in accordance with various examples.

In the centralized BLE link-cluster architecture 700, the data handling blocks are located in a single BLE device, such as a modem. In other examples, the BLE link-cluster architecture 700 may be implemented at multiple devices with close proximity, such as in the same room or building. The data handling blocks that form a BLE link-cluster architecture may also be located at different devices in one or more networks. FIG. 8 is a diagram of a PHY level distributed BLE link-cluster architecture 800 for establishing a link cluster with multiple links for a BLE device, in accordance with various examples. The PHY level distributed BLE link-cluster architecture 800 provides a LCB, such as a central device or a peripheral device, with the capability of establishing with one or more other LCBs multiple links simultaneously via duplicate BLE PHY interfaces. The duplicate BLE PHY interfaces are distributed among different devices, such as at different wireless transmitter devices connected in a one or more networks.

The PHY level distributed BLE link-cluster architecture 800 includes data handling blocks, implemented via software and/or hardware, for handling data and signals at different communication layers of the BLE protocol. The data handling blocks include, in the order shown in FIG. 8, an APP 801, a Host 802, a HCI/IF 803, a BLE LL controller 804, and duplicate BLE PHY interfaces. The APP 801, Host 802, and BLE LL controller 804 may be located at a modem 805 of the LCB. The duplicate BLE PHY interfaces may be locate at multiple transceivers 806 that are coupled to the modem 805 through one or more networks 807. The one or more networks 807 may include a group of connected BLE devices, a LAN, the Internet, or any combination of communication networks. Each transceiver 806 includes a BLE PHY controller 808, a RF FE 809, and a RF antenna 810. Each transceiver 806 is configured to establish a respective link for the LCB, transmit or receive data on the respective link, and handle the data at the signaling and RF levels. The distributed transceivers 806 can increase signal coverage and protection against failures in any of duplicate transmitter devices. The transceivers 806 may also require synchronization with the modem 805 to coordinate the transmission or reception of signals at the LCB.

Figure 9:
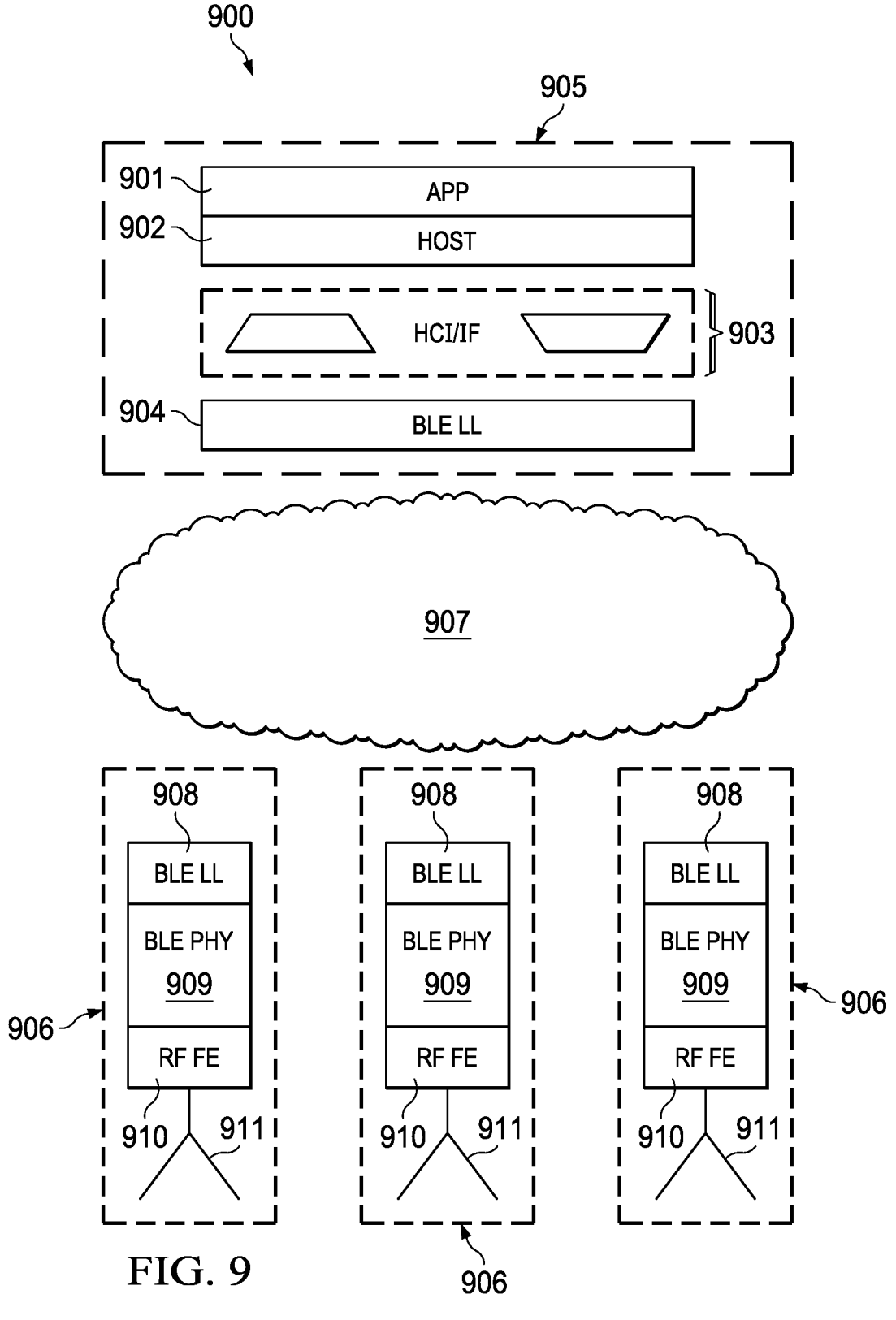
FIG. 9 is a diagram of a BLE link-cluster architecture for establishing a link cluster with multiple links for a BLE device, in accordance with various examples.

In the PHY level distributed BLE link-cluster architecture 800, data is handled at the BLE LL in a centralized manner in the modem 805. In other examples, BLE LL processing can be distributed with the BLE PHY interfaces at multiple devices. FIG. 9 is a diagram of a LL level distributed BLE link-cluster architecture 900 for establishing a link cluster with multiple links for a BLE device, in accordance with various examples. The distributed BLE link-cluster architecture 900 provides a LCB, such as a central device or a peripheral device, with the capability of establishing with one or more other LCB multiple links simultaneously via distributed BLE LL and BLE PHY interfaces. The BLE LL and BLE PHY interfaces can be distributed among different devices, such as at different wireless transmitter devices.

The LL level distributed BLE link-cluster architecture 900 includes data handling blocks for handling data and signals at different communication layers of the BLE protocol. The data handling blocks can be implemented via software, hardware, or both. The data handling blocks include, in the order shown in FIG. 9, an APP 901, a Host 902, a HCI/IF 903, a central BLE LL controller 904, and distributed sets of BLE LL and BLE PHY interfaces. The APP 901, Host 902, and central BLE LL controller 904 may be located at a modem 905 of the LCB. The BLE LL and BLE PHY interfaces may be located at multiple transceivers 906 that are coupled to the modem 905 through one or more networks 907. The one or more networks 907 may include a group of BLE devices, a LAN, the Internet, or any combination of communication networks. Each transceiver 906 includes a BLE LL interface 908 that communicates with the central BLE LL controller 904 to perform LL level time synchronization. The transceiver 906 also includes a BLE PHY controller 909, a RF FE 910, and a RF antenna 911. Each transceiver 906 is configured to establish a respective link for the LCB, transmit or receive data on the respective link, and handle the data at the signaling and LL, PHY and RF levels.

Figure 10:
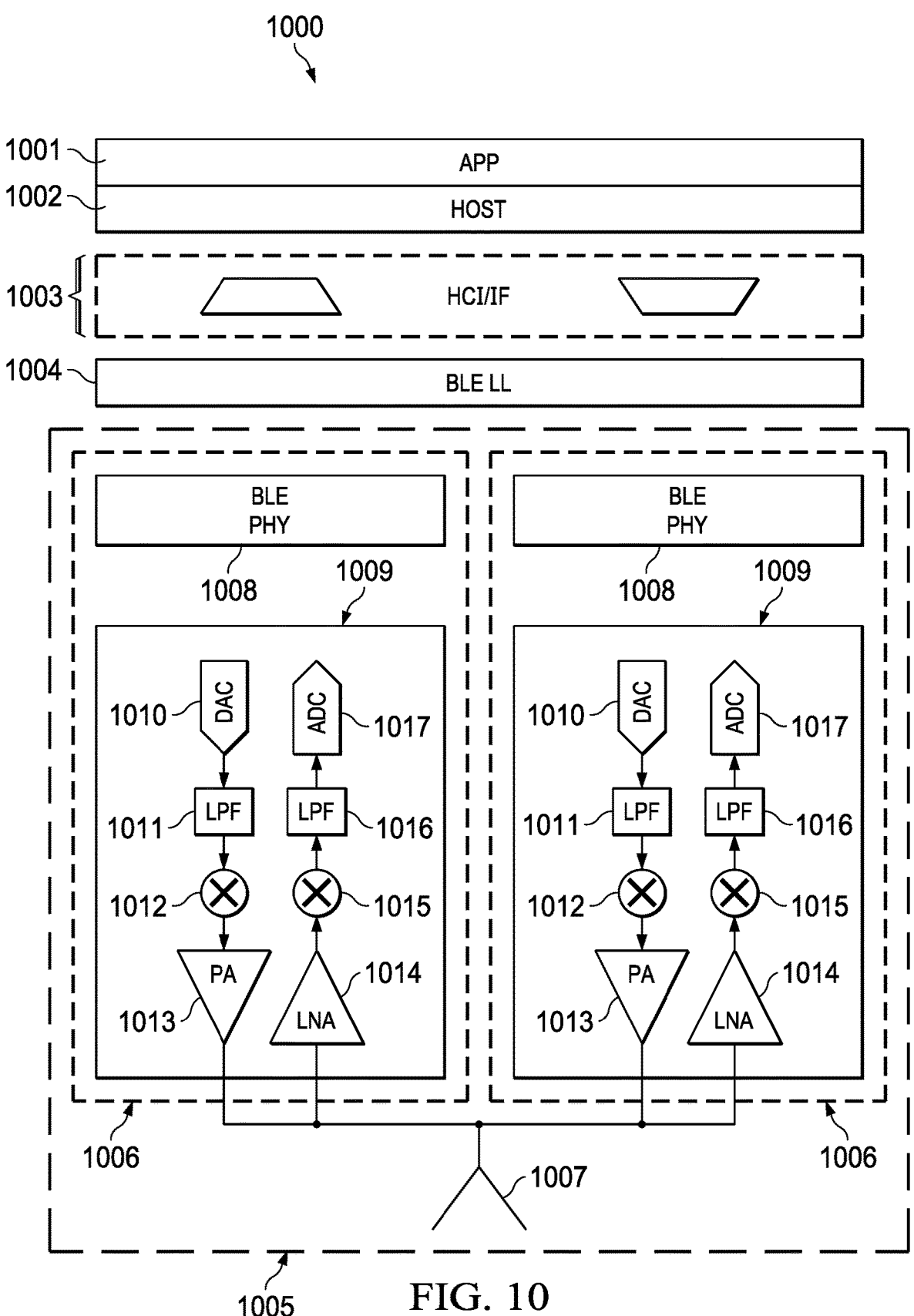
FIG. 10 is a diagram of a BLE link-cluster architecture for establishing a link cluster with multiple links for a BLE device, in accordance with various examples.

In the BLE link-cluster architectures 700, 800 and 900, the duplicate BLE PHY interfaces establish respective wireless links simultaneously via respective transceivers and RF antennas. In other examples, the wireless links can be established via a single transceiver and RF antenna to reduce power consumption by the RF circuit of the LCB. FIG. 10 is a diagram of a BLE link-cluster architecture 1000 for establishing a link cluster with multiple links for a BLE device, in accordance with various examples. The BLE link-cluster architecture 1000 provides a LCB with the capability of establishing with one or more other LCBs multiple links simultaneously via duplicate BLE PHY interfaces with a joint transceiver and RF antenna. The joint transceiver and RF antenna can reduce the power requirement of the BLE device to transmit and receive wireless signals.

The BLE link-cluster architecture 1000 includes data handling blocks for handling data and signals at different communication layers of the BLE protocol. The data handling blocks include, in the order shown in FIG. 10, an APP 1001, a Host 1002, a HCI/IF 1003, a BLE LL controller 1004, and duplicate interfaces of BLE PHY layers in a same transceiver 1005. The transceiver 1005 includes duplicate interfaces 1006 coupled to a single RF antenna 1007. For example, as shown in FIG. 10, the transceiver 1005 may include two duplicate interfaces 1006 coupled to the RF antenna 1007. Each interface 1006 includes a BLE PHY controller 1008 coupled to a RF FE 1009. To transmit signals, each RF FE 1009 may include a digital-to-analog converter (DAC) 1010 coupled to the BLE PHY controller 1008, a transmitter low pass filter (LPF) 1011 coupled to the DAC 1010, a transmitter mixer 1012 coupled to the transmitter LPF 1011, and a power amplifier (PA) 1013 coupled to the transmitter mixer 1012 and the RF antenna 1007. To receive signals, the RF FE 1009 may include a low noise amplifier (LNA) 1014 coupled to the RF antenna 1007, a receiver mixer 1015 coupled to the LNA 1014, a receiver LPF 1016 coupled to the receiver mixer 1015, and an analog-to-digital converter (ADC) 1017 coupled to the receiver LPF 1016 and the BLE PHY controller 1008.

Figure 11:
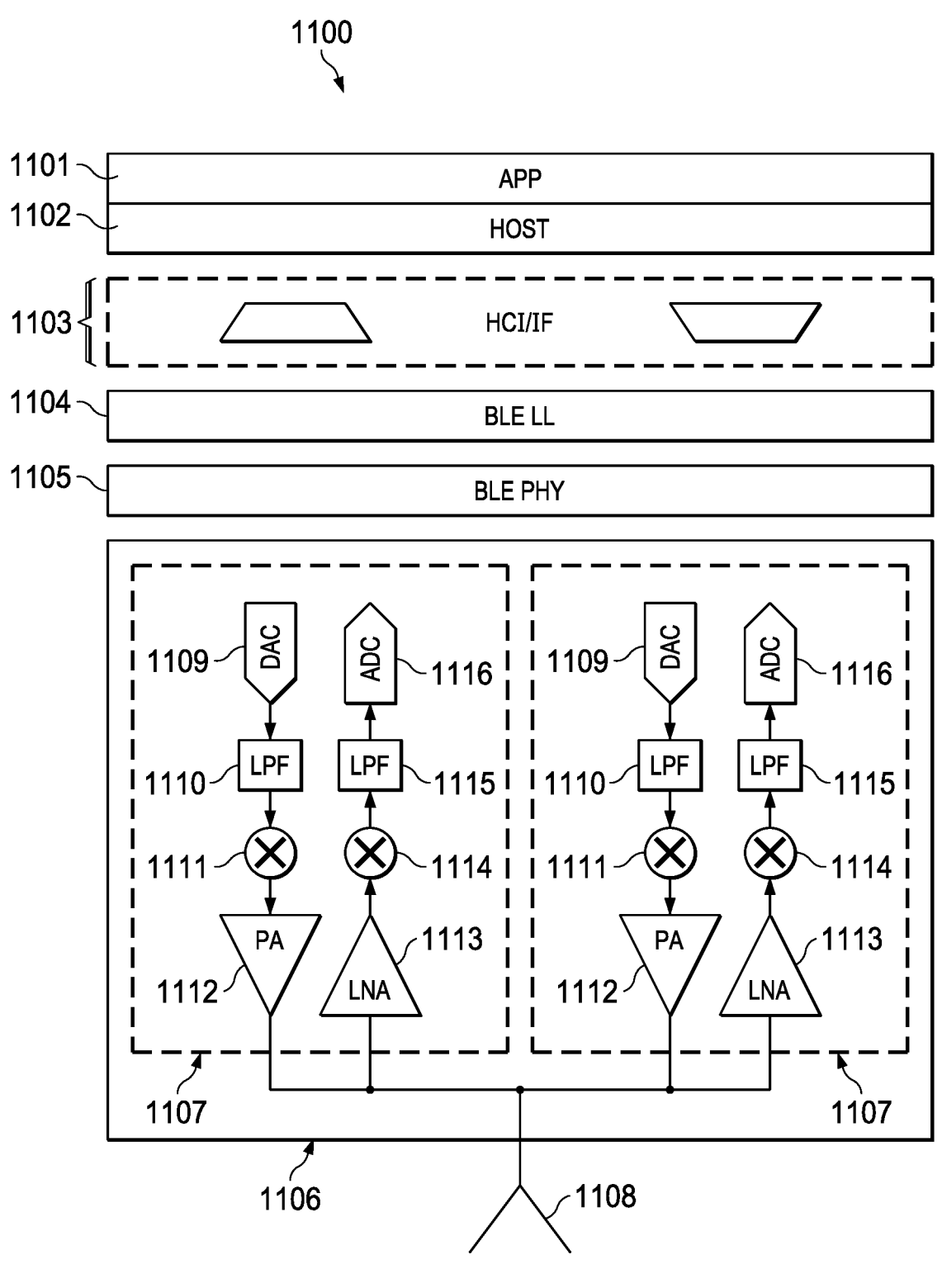
FIG. 11 is a diagram of a BLE link-cluster architecture for establishing a link cluster with multiple links for a BLE device, in accordance with various examples.

In other examples, a BLE link-cluster architecture includes a single BLE PHY controller configured to establish multiple links simultaneously via a single transceiver. FIG. 11 is a diagram of a BLE link-cluster architecture 1100 for establishing a link cluster with multiple links for a BLE device, in accordance with various examples. The BLE link-cluster architecture 1100 provides a LCB with the capability of establishing with one or more other LCBs multiple links simultaneously with a single BLE PHY controller and a single transceiver and RF antenna. The single BLE PHY controller can reduce the cost of the BLE link-cluster architecture 1100, such as in comparison to the BLE link-cluster architecture 1000 with the multiple BLE PHY interfaces.

The BLE link-cluster architecture 1100 includes, in the order shown in FIG. 11, an APP 1101, a Host 1102, a HCI/IF 1103, a BLE LL controller 1104, a BLE PHY controller 1105 and a transceiver 1106. The transceiver 1106 includes duplicate RF FEs 1007 coupled to a single RF antenna 1108. For example, as shown in FIG. 11, the transceiver 1106 may include two duplicate RF FEs 1107 coupled to the RF antenna 1108. To transmit signals, each RF FE 1107 may include a DAC 1109 coupled to the BLE PHY controller 1105, a transmitter LPF 1110 coupled to the DAC 1109, a transmitter mixer 1111 coupled to the transmitter LPF 1110, and a PA 1112 coupled to the transmitter mixer 1111 and the RF antenna 1108. To receive signals, the RF FE 1107 may include a LNA 1113 coupled to the RF antenna 1108, a receiver mixer 1114 coupled to the LNA 1113, a receiver LPF 1115 coupled to the receiver mixer 1114, and an ADC 1116 coupled to the receiver LPF 1115 and the BLE PHY controller 1105.

Figure 12:
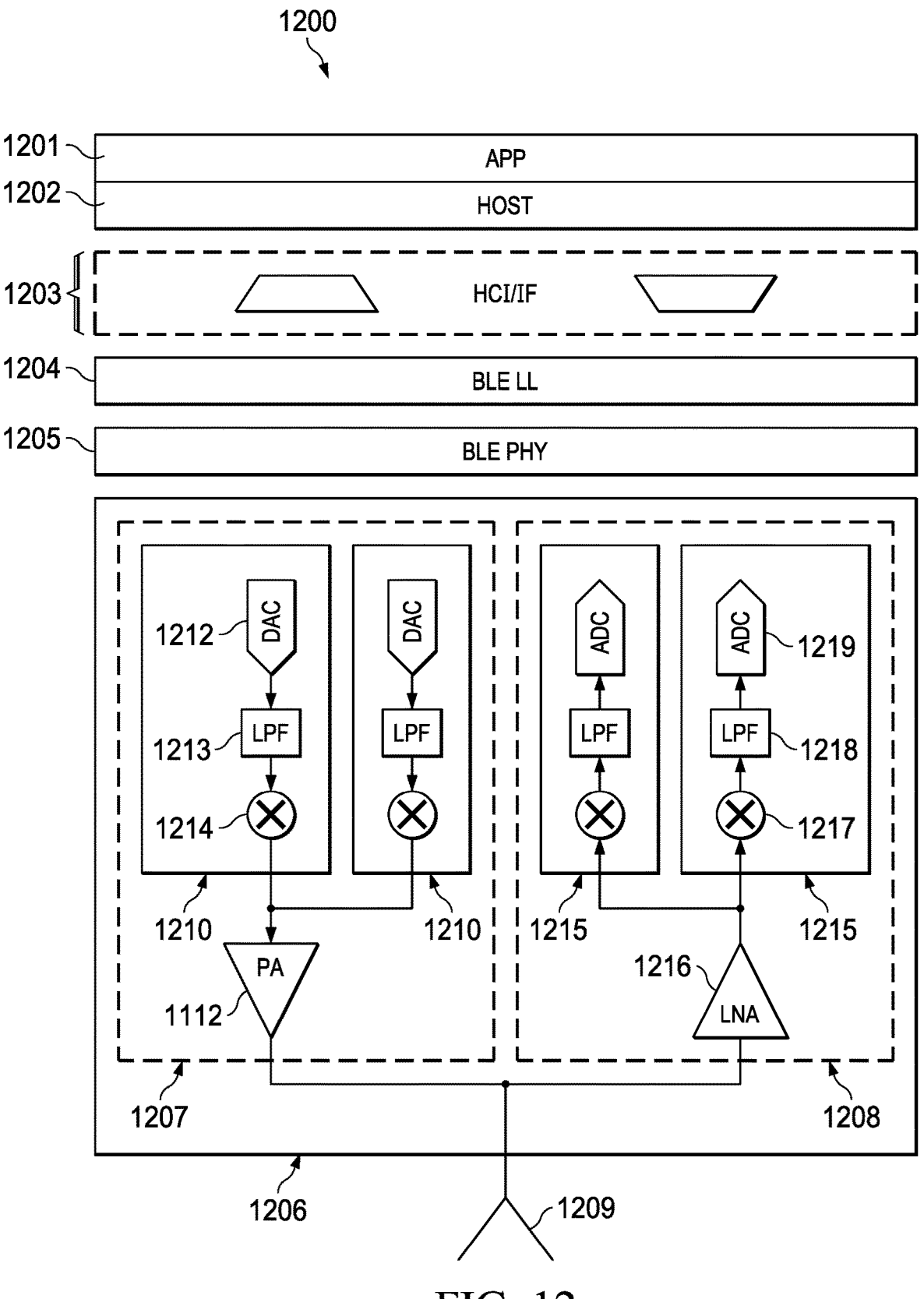
FIG. 12 is a diagram of a BLE link-cluster architecture for establishing a link cluster with multiple links for a BLE device, in accordance with various examples.

In other examples, a BLE link-cluster architecture includes a joint PA and a joint LNA configured to establish multiple links simultaneously via a single transceiver. FIG. 12 is a diagram of a BLE link-cluster architecture 1200 for establishing a link cluster with multiple links for a BLE device, in accordance with various examples. The BLE link-cluster architecture 1200 provides a LCB with the capability of establishing with one or more other LCBs multiple links simultaneously with a single transceiver and joint PA and LNA. The joint PA and LNA design can reduce the cost of the BLE link-cluster architecture 1200, such as in comparison to the BLE link-cluster architecture 1000 or the BLE link-cluster architecture 1100.

The BLE link-cluster architecture 1200 includes, in the order shown in FIG. 12, an APP 1201, a Host 1202, a HCI/IF 1203, a BLE LL controller 1204, a BLE PHY controller 1205 and a transceiver 1206. The transceiver 1206 includes a joint transmitter 1207 for transmitting signals on multiple links simultaneously, a joint receiver 1208 for receiving signals on the multiple links, and a single RF antenna 1209 coupled to the joint transmitter 1207 and the joint receiver 1208. The joint transmitter 1207 includes duplicate transmitter RF FEs 1210 coupled to a joint PA 1211. For example, as shown in FIG. 12, the joint transmitter 1207 may include two duplicate transmitter RF FEs 1210 coupled to the joint PA 1211. To transmit signals, each transmitter RF FE 1210 may include a DAC 1212 coupled to the BLE PHY controller 1205, a transmitter LPF 1213 coupled to the DAC 1212, and a transmitter mixer 1214 coupled to the transmitter LPF 1213 and the joint PA 1211. The joint receiver 1208 includes duplicate receiver RF FEs 1215 coupled to a joint LNA 1216. For example, as shown in FIG. 12, the joint transmitter 1207 may include two duplicate receiver RF FEs 1215 coupled to the joint LNA 1216. To receive signals, the receiver RF FE 1215 may include a receiver mixer 1217 coupled to the joint LNA 1216, a receiver LPF 1218 coupled to the receiver mixer 1217, and an ADC 1219 coupled to the receiver LPF 1218 and the BLE PHY controller 1205.

In other examples, the BLE link-cluster architecture, which enables a LCB to establish multiple links simultaneously with one or more other LCB s, may be a combination of any of the BLE link-cluster architectures 700, 800, 900, 1000, 1100 and 1200. For example, a BLE link-cluster architecture of a LCB can include duplicate BLE PHY interfaces distributed among different transmitter devices connected to the LCB. Any of the transmitter devices may include duplicate transceivers or a single transceiver configured to transmit or receive signals on multiple links simultaneously. The single transceiver may include duplicate RF FEs and a single RF antenna, or may include duplicate RF FEs with a joint PA in a joint transmitter and duplicate RF FEs with a joint LNA in a joint receiver.

The term "couple" appears throughout the specification. The term may cover connections, communications or signal paths that enable a functional relationship consistent with this description. For example, if device A provides a signal to control device B to perform an action, in a first example device A is coupled to device B or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device or a combination thereof.

An architecture or device that is described herein as including certain components may instead be adapted to be coupled to those components to form the described architecture or device. Unless otherwise stated, "about," "approximately," or "substantially" preceding a value means+/−10 percent of the stated value. Modifications are possible in the described examples, and other examples are possible within the scope of the claims.

What is claimed is:

1. A method comprising:
   maintaining, by a first wireless device, a link cluster that includes first and second communication links between the first wireless device and a second wireless device;
   exchanging data between the first and second wireless devices using the first communication link at a first frequency, and using the second communication link at a second frequency different from the first frequency, wherein the exchange of data between the first and second wireless devices using the first and second communication link occurs in parallel; and
   coordinating and synchronizing transmission and reception of frames of the data on the first and second communication links;
   simultaneously transmitting, receiving or transmitting and receiving the frames on the first and second communication links;
   fragmenting and reassembling the frames on the first and second communication links;
   duplicating the frames and detecting duplicated frames on the first and second communication links;
   dynamically switching the frames on the first and second communication links; or
   retransmitting the frames on the first and second communication links.

2. The method of claim 1, wherein exchanging data between the first and second wireless devices comprises:
   transmitting, by the first wireless device to the second wireless device, first data using the first communication link at the first frequency; and
   transmitting, by the first wireless device to the second wireless device, second data using the second communication link at the second frequency.

3. The method of claim 2, wherein the second data is a replica of the first data.

4. The method of claim 1, wherein exchanging data between the first and second wireless devices comprises transmitting, by the first wireless device to the second wireless device, first and second portions of the data using the first and second communication links, respectively.

5. The method of claim 1, wherein the first and second communication links are established according to a BLUETOOTH low energy (BLE) standard.

6. The method of claim 1, wherein exchanging data between the first and second wireless devices comprises:

receiving, by the first wireless device from the second wireless device, first data using the first communication link at the first frequency; and receiving, by the first wireless device from the second wireless device, second data using the second communication link at the second frequency.

7. The method of claim 6, wherein the second data is a replica of the first data.

8. The method of claim 1, wherein exchanging data between the first and second wireless devices comprises receiving, by the first wireless device from the second wireless device, first and second portions of the data using the first and second communication links, respectively.

9. The method of claim 1, wherein the first wireless device operates as a peripheral device of a first network, and the second wireless device operates as a central device of the first network.

10. The method of claim 9, further comprising exchanging further data between the first wireless device and a third wireless device, wherein the first wireless device operates as a central device in a second network, and the third wireless device operates as a peripheral device in the second network.

11. The method of claim 9, further comprising exchanging further data between the first wireless device and a third wireless device, wherein the first wireless device operates as a peripheral device in a second network, and the third wireless device operates as a central device in the second network.

12. The method of claim 11, further comprising exchanging yet further data between the third wireless device and a fourth wireless device, wherein the third wireless device operates as a peripheral device in a third network, and the fourth wireless device operates as a central device in the third network.

13. The method of claim 11, further comprising exchanging yet further data between the third wireless device and a fourth wireless device, wherein the third wireless device operates as a central device in the second network, and the fourth wireless device operates as a peripheral device in the second network.

14. The method of claim 1, further comprising exchanging further data between the first wireless device and a third wireless device using a third communication link at a third frequency different from the first and second frequencies.

15. The method of claim 14, wherein exchanging the further data between the first and third wireless devices further comprises using a fourth communication link at a fourth frequency different from the first, second, and third frequencies.

16. The method of claim 15, further comprises exchanging yet further data between the second and third wireless devices using a fifth communication link at a fifth frequency different from the first, second, third, and fourth frequencies, and using a sixth communication link at a sixth frequency different from the first, second, third, fourth, and fifth frequencies.

17. The method of claim 1, wherein the first wireless device comprises a link layer controller that maintains the link cluster between the first and second wireless devices, and wherein first and second transceivers respectively provide first and second physical layer interfaces to the link layer controller and establish the first and second communications links, respectively.

18. The method of claim 17, wherein the first and second transceivers provide the first and second physical layer interfaces to the link layer controller via a network that includes one or more wireless devices.

19. The method of claim 18, wherein the link layer controller operates as a central link layer controller, and wherein the first and second transceivers include first and second link layer interfaces.

20. The method of claim 1, wherein the first wireless device comprises a link layer controller that maintains the link cluster between the first and second wireless devices, and a transceiver that uses a single antenna to communicate with the second wireless device using the first and second communication links.

21. The method of claim 20, wherein the transceiver comprises first and second physical layer interfaces for exchanging the data using the first and second communication links, respectively.

22. The method of claim 20, wherein the first wireless device comprises:

first and second radio-frequency (RF) front end circuits for exchanging the data using the first and second communication links, respectively; and a single physical layer interface coupled to the first and second RF front end circuits.

23. The method of claim 22, wherein the first and second RF front end circuits share a power amplifier coupled to the single antenna, and a low-noise amplifier coupled to the single antenna.

24. The method of claim 1, wherein the first wireless device further comprises:

an application layer circuit that process the data at an application layer;

a host layer circuit that manages host device functions and interfaces with the application layer circuit; and a host to controller interface (HCI/IF) that provides a communication interface between the host layer circuit and a link layer controller of the first wireless device.

\* \* \* \* \*